(12) United States Patent
Lu et al.

(10) Patent No.: US 8,953,038 B2
(45) Date of Patent: Feb. 10, 2015

(54) DISTRIBUTED VIDEO SURVEILLANCE STORAGE COST REDUCTION USING STATISTICAL MULTIPLEXING PRINCIPLE

(75) Inventors: Ligang Lu, New City, NY (US); Vadim Sheinin, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1181 days.

(21) Appl. No.: 12/550,554

(22) Filed: Aug. 31, 2009

(65) Prior Publication Data

US 2011/0050895 A1 Mar. 3, 2011

(51) Int. Cl.
*H04N 7/18* (2006.01)
*H04N 11/02* (2006.01)
*H04N 11/04* (2006.01)
*H04N 19/37* (2014.01)
*H04N 19/147* (2014.01)
*H04N 19/149* (2014.01)
*H04N 19/115* (2014.01)
(Continued)

(52) U.S. Cl.
CPC ......... *H04N 7/181* (2013.01); *H04N 19/00454* (2013.01); *H04N 19/00175* (2013.01); *H04N 19/00181* (2013.01); *H04N 19/0006* (2013.01); *H04N 19/0009* (2013.01); *H04N 19/00472* (2013.01)
USPC ................... 348/143; 375/240.01; 375/240.02

(58) Field of Classification Search
CPC .................... H04N 19/00187; H04N 19/00472
USPC .......................... 348/143; 375/240.01, 240.02
See application file for complete search history.

(56) References Cited

U.S. PATENT DOCUMENTS

| 6,094,457 | A | 7/2000 | Linzer et al. |
| 6,192,083 | B1 * | 2/2001 | Linzer et al. ............. 375/240.29 |
| 6,532,593 | B1 | 3/2003 | Moroney |

(Continued)

FOREIGN PATENT DOCUMENTS

| EP | 1 102 493 B1 | 2/2007 |
| GB | 2 362 284 A | 11/2001 |

(Continued)

OTHER PUBLICATIONS

U.S. Appl. No. 12/504,074, filed Jul. 16, 2009, titled "Cost and Resource Utilization Optimization in Multiple Data Resource Transcoding."

(Continued)

*Primary Examiner* — Tonia L Dollinger
*Assistant Examiner* — Adam Cooney
(74) *Attorney, Agent, or Firm* — Jennifer R. Davis; Ryan, Mason & Lewis, LLP

(57) ABSTRACT

A plurality of data streams are obtained; they may be compressed, uncompressed, or a mixture of compressed and uncompressed. Statistical parameters associated with each of the data streams are determined. A plurality of storage constraints are obtained. A plurality of output bit rates are determined for encoding or transcoding, as the case may be, each of the data streams, based on the statistical parameters and the storage constraints. The output bit rates are determined to jointly reduce (and preferably minimize) an overall cost. The overall cost includes the cost associated with storing compressed versions of the data streams. For each of the data streams, the encoding or transcoding into the compressed versions, is carried out in accordance with the output bit rates.

25 Claims, 3 Drawing Sheets

(51) Int. Cl.
*H04N 19/124* (2014.01)
*H04N 19/40* (2014.01)

(56) References Cited

U.S. PATENT DOCUMENTS

| | | | |
|---|---|---|---|
| 6,642,967 | B1 | 11/2003 | Saunders |
| 7,130,310 | B2 | 10/2006 | Itawaki et al. |
| 7,221,857 | B2 | 5/2007 | Zimmermann |
| 7,474,673 | B1 * | 1/2009 | Kennealy ............... 370/466 |
| 8,234,682 | B2 * | 7/2012 | Dvir et al. ............... 725/115 |
| 2003/0037160 | A1 | 2/2003 | Wall et al. |
| 2005/0036547 | A1 | 2/2005 | Vetro et al. |
| 2005/0105563 | A1 | 5/2005 | Suzuki et al. |
| 2005/0157660 | A1 | 7/2005 | Mandato et al. |
| 2005/0177859 | A1 | 8/2005 | Valentino, III et al. |
| 2006/0088092 | A1 | 4/2006 | Chen et al. |
| 2006/0133775 | A1 | 6/2006 | Ju |
| 2006/0168637 | A1 | 7/2006 | Vysotsky et al. |
| 2006/0268889 | A1 | 11/2006 | Nozawa |
| 2007/0002865 | A1 | 1/2007 | Burks et al. |
| 2008/0001791 | A1 | 1/2008 | Wanigasekara-Mohotti et al. |

FOREIGN PATENT DOCUMENTS

| | | |
|---|---|---|
| JP | 6343158 | 12/1994 |
| JP | 2002 016882 | 1/2002 |
| JP | 2007 060547 | 3/2007 |

OTHER PUBLICATIONS

Constant bitrate—Wikipedia, http://en.wikipedia.org/wiki/Constant_bitrate, Jul. 16, 2009, pp. 1.

Variable bitrate—Wikipedia, http://en.wikipedia.org/wiki/Variable_bitrate, Jul. 16, 2009, pp. 1-2.

R. Vanam, "H.264/MPEG-4 AVC Encoder Parameter Selection Algorithms for Complexity Distortion Tradeoff," IEEE, Data Compression Conference, May 26, 2009, 11 pages.

* cited by examiner

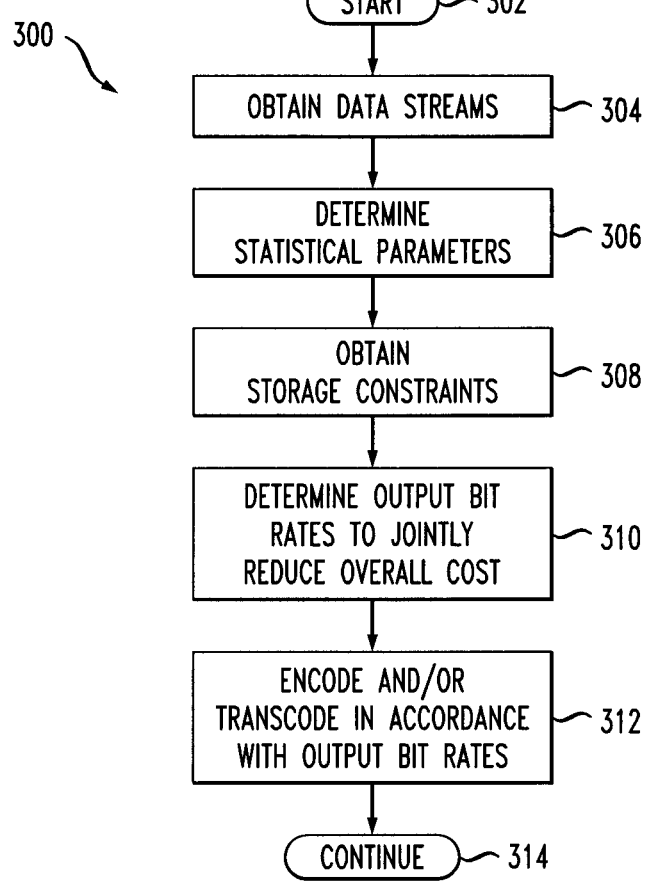
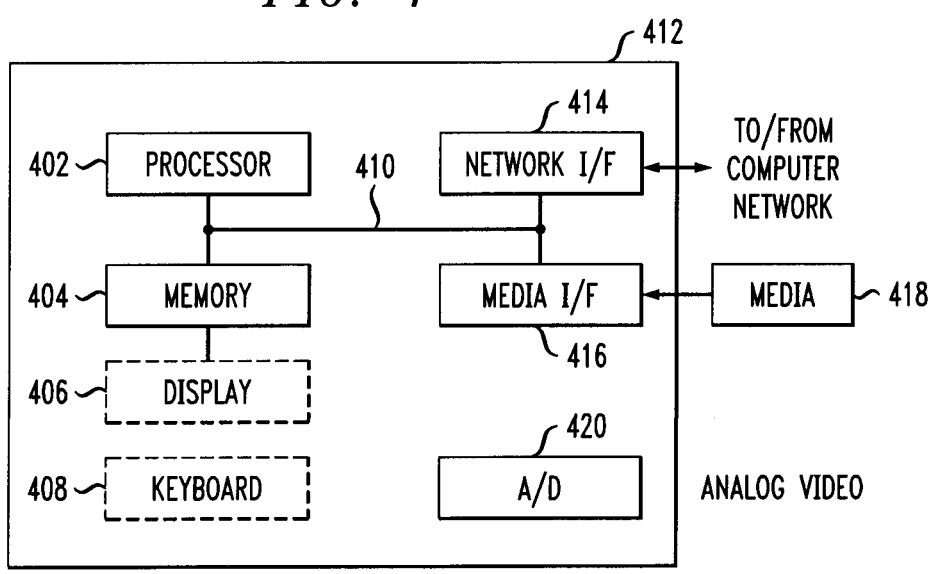

DISTRIBUTED VIDEO SURVEILLANCE STORAGE COST REDUCTION USING STATISTICAL MULTIPLEXING PRINCIPLE

FIELD OF THE INVENTION

The present invention relates to the electrical, electronic and computer arts, and, more particularly, to encoding and/or transcoding data sources and the like.

BACKGROUND OF THE INVENTION

In the distributed video coding applications, such as video surveillance, the video cameras, often in an array of hundreds or even thousands of cameras, record scenes into video sources. The analog cameras output uncompressed video data (or raw video data); the digital cameras generate compressed video streams (such as MPEG4 and Motion JPEG coded streams). The compressed or uncompressed video data is then archived at a central storage center. Both the analog and digital cameras usually output the video at a fixed data rate, regardless of whether the output is compressed or not. Furthermore, even when the cameras compress the video, the encoders that the cameras equip usually do not employ a state-of-the-art codec. The compression efficiency is not good. For example, the most common digital video cameras encode the video using the old generation standard MPEG4 or Motion JPEG due to the low complexity, i.e., the low encoding cost requirement for the camera cost constraint. Thus, directly storing the outputs of the video surveillance cameras will incur a very high storage cost, especially when the number of cameras is large.

Statistical multiplexing has previously been used for transmission bandwidth sharing among multiple sources. The principle of statistical multiplexing is to dynamically allocate a share of the total available bandwidth according to certain statistics that reflect the signal characteristics of a source. For example, a source with higher information entropy or signal energy at a given time may be allocated a larger share of the bandwidth compared to a source with less information entropy or signal energy. The sum of the bandwidth shares of all sources being transmitted equals to the total transmission bandwidth available at the given time.

SUMMARY OF THE INVENTION

Principles of the present invention provide techniques for distributed video surveillance storage cost reduction using the statistical multiplexing principle. In one aspect, an exemplary method (which can be computer implemented) includes the step of obtaining a plurality of data streams. The streams may be compressed, uncompressed, or a mixture of compressed and uncompressed. Additional steps include determining statistical parameters associated with each of the data streams and obtaining a plurality of storage constraints. A further step includes determining a plurality of output bit rates for encoding or transcoding, as the case may be, each of the data streams, based on the statistical parameters and the storage constraints. The output bit rates are determined to jointly reduce (and preferably minimize) an overall cost. The overall cost includes the cost associated with storing compressed versions of the data streams. Yet another step includes, for each of the data streams, carrying out the encoding or transcoding into the compressed versions, in accordance with the output bit rates.

In another aspect, an exemplary apparatus includes a statistics estimator, a joint encoding controller coupled to the statistics estimator, and a plurality of encoder-transcoders coupled to the joint encoding controller. The statistics estimator is configured to determine statistical parameters associated with each of a plurality of data streams. The joint encoding controller is configured to obtain a plurality of storage constraints and determine a plurality of output bit rates for encoding or transcoding each of the data streams, as the case may be, based on the statistical parameters and the storage constraints. As described above, the output bit rates are determined to jointly reduce (and preferably minimize) an overall cost. The overall cost includes the cost associated with storing compressed versions of the data streams. The plurality of encoder-transcoders are configured to, for each of the data streams, carry out the encoding or transcoding, as the case may be, into the compressed versions, in accordance with the output bit rates.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a computer readable storage medium (or multiple such media).

One or more embodiments of the invention may offer one or more of the following technical benefits:
- reduction in overall storage cost subject to the storage constraints
- ability to handle cameras of different formats (uncompressed; compressed in, e.g., JPEG, MPEG-4, etc.)
- external rate control function not needed on each camera
- no need for feedback channel to camera, thus reducing delay and bandwidth consumption
- ability to unify the format of the stored video streams so that the retrieval (search and decoding) hardware or software (and therefore its cost and operation) are reduced and simplified.
- for the available storage space, the overall quality of the stored video is improved or even maximized.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 3 shows a flow chart of an exemplary method, according to another aspect of the invention; and FIG. 4 depicts a computer system that may be useful in implementing one or more aspects and/or elements of the invention.

DETAILED DESCRIPTION OF PREFERRED EMBODIMENTS

One or more embodiments of the invention advantageously provide efficient storage to archive the recorded video data from distributed video surveillance (DVS) systems, to dramatically reduce the storage cost. One or more instances of the invention employ encoding and/or transcoding, using the principles of statistical multiplexing, to exploit the statistical differences in the video sources to compress the video sources accordingly, to reduce and even minimize the overall storage cost for a given quality requirement and target archive time.

Figure 1:
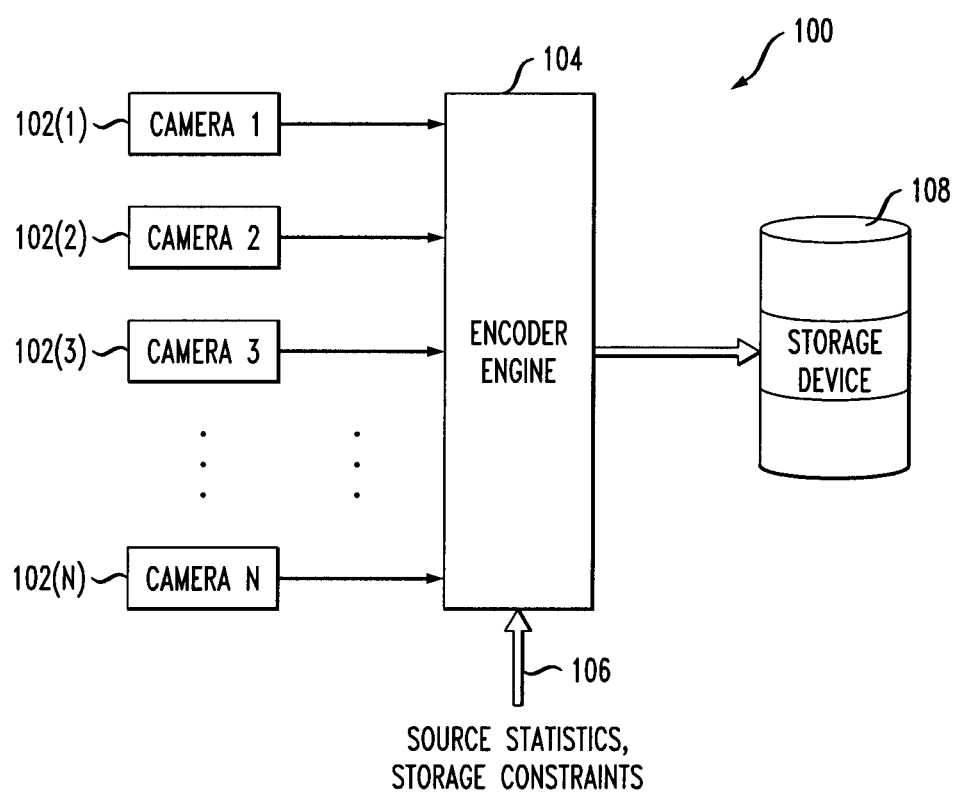
FIG. 1 shows an exemplary embodiment of a system, according to an aspect of the invention.

In one non-limiting exemplary embodiment 100, as shown in FIG. 1, the uncompressed output video sources of the N analog cameras 102(1) through 102(N) are first fed to an encoder engine 104, which employs a state-of-the-art video compression technique to jointly compress the multiple video sources efficiently. Instead of the fixed rate or constant rate encoding as done in the prior art, the encoder engine 104 determines the encoding rate for each video input source based on its statistics and uses statistical multiplexing to jointly reduce or minimize the overall storage cost for the given quality requirement and the targeted storage time lengths. The input of source statistics and storage constraints to the engine is shown at 106. The jointly statistical based compressed streams are then archived on the storage device 108.

Thus, it will be appreciated that camera outputs are typically constant bit rate (CBR). However, oftentimes, the scenes typically have very little or no changes, thus rendering the CBR approach quite inefficient. Furthermore, the video storage cost for DVS systems may be quite significant. Advantageously, one or more embodiments provide a method and system of storage cost reduction for DVS with N cameras 102(1) through 102(N). For each camera video output $S_i$, and a given set $V_i$ of storage constraints (for example, fidelity $d_i$, archive time length $t_i$), there will be an associated storage cost $C(S_i, V_i)$. In one or more embodiments, compress the N camera video outputs jointly to reduce the overall storage cost, subject to all the storage constraints:

$$\text{Min} \sum_{i=1}^{N} C(S_i, V_i) \quad (1)$$

One or more embodiments may provide one or more of the following advantages:
  Ability to exploit the statistics of the video sources and employ VBR (variable bit rate) or piece-wise CBR (for example, statistical multiplexing-like) encoding strategies to jointly reduce the overall storage cost for the given storage constraints.
  Can improve the overall fidelity if the available storage space is fixed for the given storage requirements.

Thus, in one or more embodiments, in DVS with N cameras, for each and every camera output, estimate the source statistics, and jointly determine the coding bit rate for each of the sources such that the overall storage cost is reduced subject to all the storage constraints being satisfied. Advantageously, one or more embodiments of the invention overcome the high storage cost of directly storing uncompressed video (for example, from analog cameras), which otherwise tend to result in difficult processing and indeed lack of feasibility for large DVS applications. Furthermore, one or more embodiments provide performance superior to the direct storage of CBR compressed video (for example, from digital cameras), inasmuch as CBR coding using Motion JPEG or MPEG-4 is not efficient and the storage cost for large DVS systems in such cases is still very significant.

Figure 2:
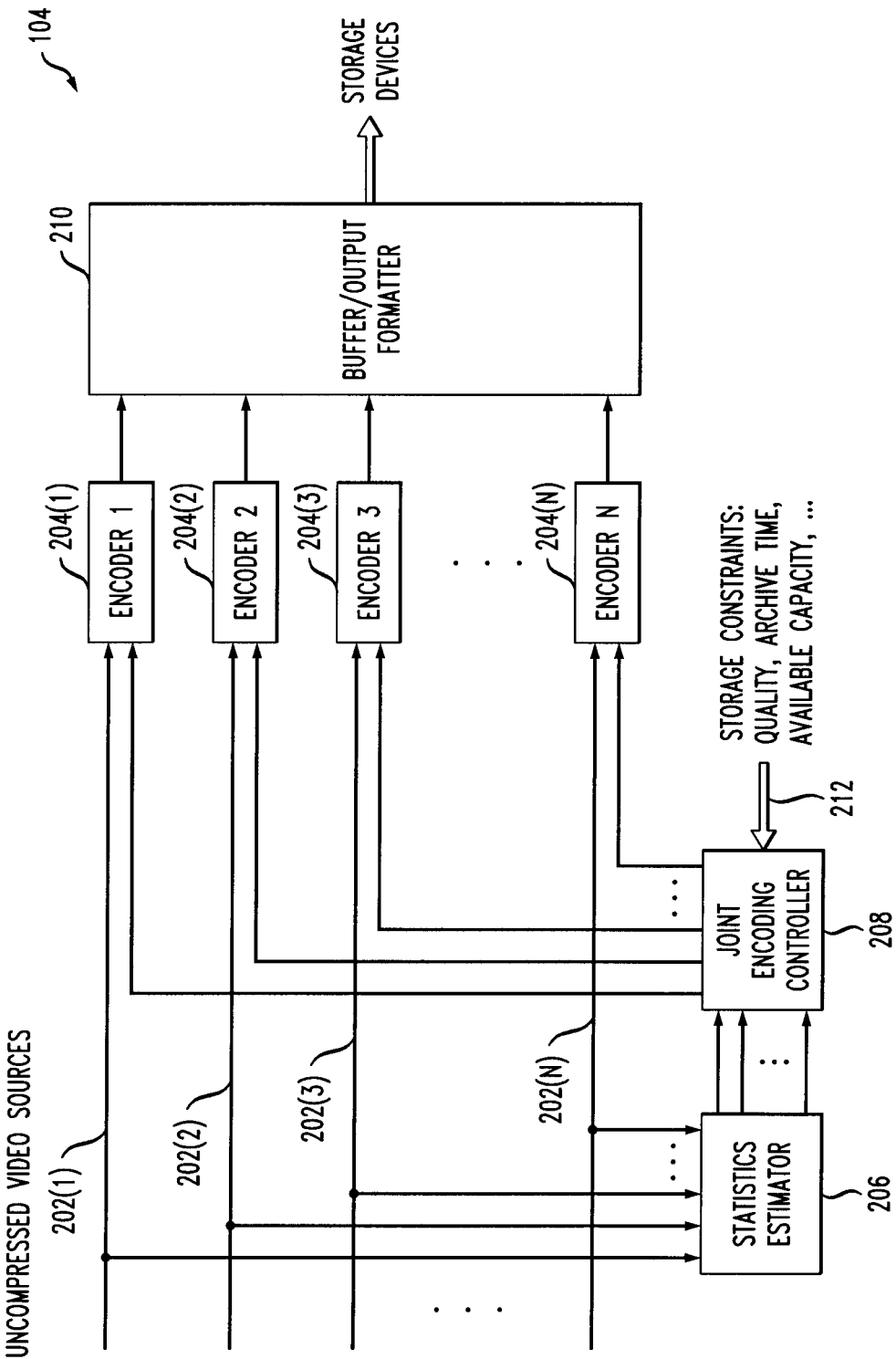
FIG. 2 shows details of an encoder engine of FIG. 1.

FIG. 2 shows non-limiting exemplary details of the encoder engine 104 of FIG. 1. N uncompressed video sources 202(1) through 202(N) are handled (for example, from cameras 102(1) through 102(N) of FIG. 1). Each video source 202 is provided to both a corresponding encoder 204(1) through 204(N) and a statistics estimator 206. Statistics estimator 206 provides the estimated statistics for each uncompressed video source 202(1) through 202(N) to joint encoding controller 208. As shown at 212, joint encoding controller 208 also takes as input the storage constraints; for example, the required quality, the length of time the video is to be archived for, the available capacity in storage device(s) 108, and so on. Joint encoding controller 208 then provides input to each encoder 204(1) through 204(N) to set the encoding (bit) rate for each video input source based on its (as well as the other video sources') statistics. Statistical multiplexing is used to minimize the overall storage cost for the given quality requirement and the targeted storage time lengths. The jointly statistical based compressed streams are then temporarily stored to buffer/output formatter 210, where optional operations of output stream formatting, such as packetization or multiplexing, may be done and the output is archived on the storage device(s) 108.

In at least some instances, blocks 206, 208, and 204 can be implemented by an appropriately programmed hardware processor; for example, one IBM "Cell" microprocessor (available from International Business Machines Corporation of Armonk, N.Y., USA) can simultaneously perform H.264 encoding in standard format (720×480 at 30 frames per second) for sixteen cameras (i.e., N=16).

The specific embodiments depicted herein are not intended to be limiting. For example, one or more embodiments may be used for other applications and/or services involving a large volume of video archiving, such as television broadcast, video streaming services, and the like. Furthermore, in some instances, one, some, or all of the video sources 202 are compressed and are transcoded instead of encoded in blocks 204, in accordance with the principles described herein. Still further, although other types of data streams, such as audio, typically have a much lower storage requirement than video, one or more techniques of the invention could be applied to audio or other types of data if desired. Other non-limiting examples of volume intensive archive and/or storage applications include multimedia entertainment, medical applications, military applications, and the like.

In at least some cases, the outputs (bit rates and qualities) of encoders 204 vary accordingly to the source statistics and storage requirements, such that the overall storage cost is reduced. It should be noted that a number of different encoding or transcoding schemes can be employed, and a number of different techniques can be employed to minimize the expression in equation (1).

It should be noted that statistical multiplexing (sometimes referred to in brief as StatMux) has been used for channel bandwidth sharing among multiple data streams, e.g., TV channels. In such cases, each output of the encoder is typically packetized and then multiplexed with the packets of the outputs of other encoders into one stream and send through a channel for bandwidth sharing (or time division). An issue in such cases has been to smooth the quality over these channels under the constraint of the given channel bandwidth. In one or more instances, statistical multiplexing could be used as one possible embodiment for storage reduction. Instead of the channel bandwidth, the pertinent parameters are the storage capacity and required archiving time in addition to the fidelity requirement.

For the avoidance of doubt, it should be noted that certain current techniques employ StatMux to minimize the transmission channel bandwidth for the given quality requirement. In contrast, one or more embodiments of the invention only use the principle of StatMux to guide the encoding and/or transcoding, to minimize the overall storage cost subject to the storage constraints. In one or more instances, the storage space is shared by the N output streams with the goal to minimize the total storage cost while satisfying the quality requirement and achieving the required storage time for each and every one of these streams. However, the actual outputs are not necessarily multiplexed if the outputs are only sent to the storage device and the output link to that device has sufficient bandwidth. Thus, in at least some instances, there is no need to format the streams into packets and multiplex them into one data stream. In fact, it will typically be easier, faster, and cheaper to store the un-multiplexed streams for search and retrieval.

One or more embodiments of the invention thus provide techniques to reduce or even minimize the overall storage cost, and to take into account the overall storage and encoding and/or transcoding. Furthermore, in one or more embodiments, the encoding and/or transcoding (by blocks 204) is done at the receiver side, that is, remote from cameras 102. Accordingly, one or more embodiments advantageously do not require the cameras 102 to all operate using the same coding format and/or do not require the cameras 102 to have an external rate control function. Furthermore, carrying out the encoding and/or transcoding at the receiver side advantageously eliminates the need for sending the assigned bit rate to each camera/encoder combination over a network, such that no feedback channel is required for each camera 102 to receive the bit rate, which would likely be undesirable for real-time operation, due to additional delay and bandwidth consumption.

One or more embodiments may be implemented in one or more different fashions. Digital or analog cameras 102 can be employed. They may be connected to engine 104 by any suitable network, dedicated cabling, or the like. Statistics estimator 206 may be implemented, for example, by suitable software or firmware on a general or special purpose hardware processor. With reference to FIG. 4, which will be discussed further below, if the video sources are provided as analog signals, they may be input to an analog-to-digital converter 420 connected with system bus 410 and then provided to estimator 206 in digitized forms. In other embodiments, the signals could be digitized at the camera location. Digital signals could be input, for example, to network interface 414 connected with system bus 410 and then provided to estimator 206. Estimator 206 may estimate, for example, the complexity of a frame or a part of frame or a group of frames. The complexity is a measure that reflects the difficulty of compressing the frame. It can be estimated, for example, by measuring the variance of the signal to be encoded or by the amount of the encoding bits and the quantizer step size used in the coded frame or a part of the frame or a group of the frames, respectively.

Encoders 204 may be implemented using a variety of techniques, including suitable software or firmware on a general or special purpose hardware processor, which, in general, may be the same or a different processor as compared to that which implements statistics estimator 206. In some instances, a general purpose processor with separate hardware acceleration, or dedicated hardware, can be used. All the encoders could be implemented on the same processor, each could be on its own processor, or one or more could be on a first processor, one or more on another processor, and so on. Video can be provided to the encoders in a manner similar to that described with respect to the statistics estimator.

Non-limiting examples of encoders that can be used include encoders in accordance with the ITU-T H.264 standard and the ISO/IEC MPEG-4 AVC standard. Each encoder 204 may implement the same (e.g., H.264) standard or a different standard, and as noted, where some inputs are digitally encoded, some of the encoders 204 may be transcoders, for example from JPEG to H.264 or from MPEG-4 Part 2 to H.264. Joint encoding controller 208 may set different parameters of encoders 204 to achieve the desired reduction or even minimization of storage costs under given constraints. Examples of such parameters include the output bit rate of the encoders 204. The encoder output bit rate parameter is typically given to the encoder as a target coding bit rate and the encoder will use it to determine the other coding parameters.

Joint encoding controller 208 may be implemented, for example, by suitable software or firmware on a general or special purpose hardware processor, which, in general, may be the same or a different processor as compared to that/those which implement(s) statistics estimator 206 and/or encoder(s) (and/or transcoders) 204.

In one or more embodiments, for N input data streams $S_1$, $S_2$, ..., $S_N$, (e.g., 202(1) through 202(N)), the system determines appropriate parameters for each encoder 204. Given the available encoding resources and given storage space, the objective is to determine, considering each input stream, the appropriate parameters (e.g., output rate bit rate), so as to jointly minimize the overall cost while satisfying the quality and storage requirements.

The data streams $S_1, S_2, \ldots, S_N$ may have different formats, i.e., some may be coded or compressed using some coding techniques such as Motion JPEG, MPEG-2, MPEG-4, H.264, etc.; others may be uncompressed (raw, e.g., analog). The determination regarding what parameters (specified by controller 208) to use for a given encoder 204 can be based, for example, on the required storage time length (i.e., the length of time that the encoded data needs to be stored; for example, the feed from a surveillance camera might be stored for three months) and the required minimum fidelity for each stream (e.g., encoding using certain parameters might be so lossy that the required minimum fidelity could not be met) as well as the corresponding encoding cost and storage cost. Storage cost is associated with the required storage resources; e.g., three months of surveillance camera feed at a certain data rate for the encoded data gives the required size of the storage). Encoding cost includes computational and other operational costs. Note that the streams may emanate from a number of different sources; e.g., multiple surveillance cameras. Further, each source may have one or more streams; for example, a single surveillance camera may have an audio stream and a video stream.

The input streams are encoded using the appropriate encoding parameters (e.g., bit rate) based on control of encoders 204 by joint encoding controller 208. The N input data streams $S_1$, $S_2$, ..., $S_N$, are encoded to N outputs $O_1$, $O_2$, ..., $O_N$. The outputs of the encoders are fed to buffer and output formatter 210 and stored in storage 108. The cost calculations needed to make the encoding decision can be made by controller 208 based upon the statistics from estimator 206 and the storage constraints input at 212.

In one or more embodiments of the invention, all sources need not necessarily be encoded, e.g. if a stream will only be stored for a very short time period and its file size is not large, it may be best not to encode it. For instance, the incurred encoding cost may outweigh the storage cost savings that could have been achieved through encoding. The controller

208 aims to reduce, and preferably minimize, the overall storage and resource cost. Advantageously, it is possible, with one or more instances of the invention, to jointly improve the resource utilization over multiple streams and/or to reduce the overall storage and transcoding cost.

Controller 208 determines the output coding rate (or quality), and optionally, the format, for each of the streams 202, which will result in the lowest overall storage and encoding cost, subject to the storage requirement and resource constraints. Engine 104 then conducts the encoding in accordance with the control of controller 208.

Embodiments of the invention are not limited to any particular minimization technique. More specifically, but without limiting the generality of the invention, the following description gives an example of how the cost can be calculated and minimized. Designate as Ti the $i^{th}$ element 204; some of the Ti do transcoding and some do only encoding; this depends on whether the input source is compressed or not. The encoders and transcoders perform variable bit rate (VBR) coding or piece-wise constant bit rate (CBR) coding according to the bit rate specified by the controller 208. Let c be the unit storage cost, i.e., the cost of storing one unit of data for the period of one unit of time. For each $S_j$, there are requirements for a minimum storage time length $L_j$, and a minimum stored data quality or a maximum distortion $D_j$. Let $|Oj|$ be the file size of Oj. The storage cost for $O_j$ can be calculated as:

$$C(S_j, V_j) = cL_j|O_j| j=1,2,\ldots,N. \quad (2)$$

If $S_j$ is a continuously flowing source and the output $O_j$s cannot be measured in a finite size, only a part of $O_j$ is stored (note that a continuously flowing source would require infinite storage if it were to be permanently stored). Let $R_j$ be the average (output) bit rate of $O_j$, then the minimum storage space needed is $L_jR_j$ and the storage cost for $O_j$ is:

$$C(S_j, V_j) = cL_j^2 R_j, j=1,2,\ldots,N. \quad (3)$$

The overall storage cost for the N sources is:

$$C = \sum_{j=1}^{N} C(S_j, O_j) = \sum_{j=1}^{N} cL_j^2 R_j. \quad (4)$$

Minimum overall storage cost can be achieved through finding the parameter vector $R=(R_1, R_2, \ldots, R_N)$ for each $S_j$, $j=1,2,\ldots,N$; such that:

$$C^* = \underset{R}{\operatorname{argmin}} C \text{ s.t. } L_j, D_j; j=1,2,\ldots,N. \quad (5)$$

The rate R can be derived through a theoretical rate-distortion model or empirical formulas in a number of ways. For example, if $S_j$ is a memoryless zero-mean Gaussian source with a variance $\sigma_j^2$ estimated by 206, the rate-distortion function is given by $$R_j(D_j) = \frac{1}{2}\log_2(\sigma_j^2/D_j), \text{ if } D_j \le \sigma_j^2 \quad (6)$$
$$= 0, \quad\quad\quad\quad\quad\quad \text{ if } D_j > \sigma_j^2$$

Another way to empirically determine the rate for each source is $$R_j = \overline{R} + \frac{1}{2}\log_2 \frac{X_j}{\rho^2}, j=1,2,\ldots,N. \quad (7)$$

Where:
$X_j$ is the complexity estimate of the source $S_j$ from 206,
$\rho$ is the geometric mean of $X_j$ $$\rho = \left(\prod_{j=1}^{N} X_j\right)^{\frac{1}{N}}, \text{ and} \quad (8)$$

$$\overline{R} = \frac{1}{2}\log_2 \frac{Nh\rho}{D}$$

with $D = \sum_{j=1}^{N} D_j$ and h is a constant determined by the normalized sources $S_j/\sigma_j$, $j=1,\ldots,N$.

The various embodiments of the invention described here can be applied to many different scenarios. For example, aspects of the invention are applicable to reduce the overall operational cost for existing or available encoding and storage sources. Furthermore, one or more instances of the invention can be applied in the system planning and designing process for application specific encoding and storage systems to reduce the overall deployment investment. Yet further, embodiments of the invention can be employed in resource sharing, to efficiently make use of the existing resources.

Reference should now be had to flow chart 300 of FIG. 3, which depicts an exemplary method, according to an aspect of the invention. After beginning at 302, step 304 includes obtaining a plurality of data streams. Step 306 includes determining statistical parameters associated with each of the data streams. Step 308 includes obtaining a plurality of storage constraints. Step 310 includes determining a plurality of output bit rates for one of encoding and transcoding each of the data streams, based on the statistical parameters and the storage constraints, to jointly reduce an overall cost. The overall cost includes a cost associated with storing compressed versions of the data streams. Step 312 includes, for each of the data streams, carrying out encoding or transcoding, as the case may be, into the compressed versions, in accordance with the output bit rates. Processing continues in block 314.

In some instances, the data streams are obtained from video surveillance cameras. In one or more embodiments, the statistical parameters are complexity parameters. As discussed above, such may include, for example, the complexity of a frame or a part of frame or a group of frames. The complexity is, as noted, a measure that reflects the difficulty of compressing the frame. Non-limiting examples of storage constraints include quality, length of archive time, and available storage capacity.

For the avoidance of doubt, when it is mentioned herein, including the claims, that one of encoding and transcoding each of the data streams is carried out, it should be understood that this generally includes a case where the data streams are uncompressed, and the one of encoding and transcoding comprises encoding; a case where the data streams are compressed, and the one of encoding and transcoding comprises transcoding; and a case where some of the data streams are uncompressed and some of the data streams are compressed, and the carrying out the one of encoding and transcoding into the compressed versions, in accordance with the output bit rates, includes transcoding the compressed data streams and encoding the uncompressed data streams. Stated in another way, step 310 includes determining a plurality of output bit rates for encoding (in the case of raw data) and transcoding (in the case of encoded data) each of the data streams, based on the statistical parameters and the storage constraints, to jointly reduce the aforementioned overall cost. Step 312 includes, for each of the data streams, carrying out encoding (in the case of raw data) or transcoding (in the case of encoded data), as the case may be, into the compressed versions, in accordance with the output bit rates.

In a preferred approach, in the step 310 of determining the plurality of output bit rates, the plurality of output bit rates are determined to jointly minimize the overall cost. In some cases, the plurality of output bit rates are determined directly; i.e., step 310 yields actual bit rates. In other instances, the plurality of output bit rates are determined indirectly, by specifying a quantization step size for encoding or transcoding (for example, controller 208 may make such determination).

In some instances, the method may include (not shown in FIG. 3 but discussed in detail below) providing a system. The system includes distinct software modules, each of which is embodied on a computer-readable storage medium. The distinct software modules may include a statistics estimator module to implement block 206 and a joint encoding controller module to implement block 208.

In general, data streams may be obtained from cameras or the like via suitable hardware or network connections; step 306 may be carried out, for example, by block 206; steps 308 and 310 may be carried out, for example, by block 208; and step 312 may be carried out by elements 204 under control of block 208.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. In another example, computer readable program code configured to facilitate carrying out encoding or transcoding might actually carry out such encoding or transcoding, or might instruct hardware to carry out such encoding or transcoding, or some combination.

In another aspect, an exemplary apparatus includes a statistics estimator 206, a joint encoding controller 208 coupled to the statistics estimator, and a plurality of encoder-transcoders 204 coupled to the joint encoding controller. An encoder-transcoder includes hardware and/or software implemented on at least one hardware processor which carries out encoding and/or transcoding. In some cases, some of the data streams are uncompressed and some of the data streams are compressed, and the plurality of encoder-transcoders are configured to carry out encoding or transcoding into the compressed versions, in accordance with the output bit rates, by transcoding the compressed data streams and encoding the uncompressed data streams.

The elements of the apparatus may carry out method steps as described above. In some instances, all the elements are implemented as distinct software modules executing in one or more hardware processors. In other instances, all the elements except the encoder-transcoders are implemented as distinct software modules executing in one or more hardware processors, while the encoder-transcoders are implemented in hardware. Other approaches are possible.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Analog-to-digital converter(s) 420 may be provided to receive analog input, such as analog video feed, and to digitize same. Such converter(s) may be interconnected with system bus 410.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium; the modules can include, for example, any or all of the encoder engine 104 or its constituent estimator 206, controller 208, and/or encoders 204 as well as aspects of output formatter 210. The method steps can then be carried out using the distinct software modules and/or sub-modules of the system, as described above, executing on one or more hardware processors 402. In some cases, specialized hardware may be employed to implement one or more of the encoders (or transcoders) 204. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising the steps of:
   obtaining a plurality of data streams;
   determining statistical parameters associated with each of said data streams;
   obtaining a plurality of storage constraints;
   determining a plurality of output bit rates for one of encoding and transcoding each of said data streams, based on said statistical parameters and said storage constraints, to jointly reduce an overall cost, said overall cost comprising a cost associated with storing compressed versions of said data streams, wherein determining an output bit rate for a data stream is based on the statistical parameters associated with each of said data streams; and
   for each of said data streams, carrying out said one of encoding and transcoding into said compressed versions, in accordance with said output bit rates,
   wherein said encoding and transcoding is not performed for a data stream if an incurred encoding/transcoding cost is greater than a storage cost savings achieved by the encoding/transcoding,
   wherein storage cost is calculated based on a minimum storage time, a maximum distortion, and a file size, and wherein the storage cost is calculated as:

$$C(S_j, V_j) = cL_j|O_j|j=1,2\ldots N,$$

wherein $L_j$ is the minimum storage time, $O_j$ is the file size, $S_j$ is the plurality of data streams, $V_j$ is the plurality of storage constraints, c is a unit storage cost, j is a natural number greater than 0 and N is a number of data stream sources.

2. The method of claim 1, wherein said data streams are obtained from video surveillance cameras.

3. The method of claim 2, wherein said statistical parameters comprise complexity parameters.

4. The method of claim 2, wherein said storage constraints comprise at least quality, length of archive time, and available storage capacity.

5. The method of claim 1, wherein said data streams are uncompressed, and wherein said one of encoding and transcoding comprises encoding.

6. The method of claim 1, wherein said data streams are compressed, and wherein said one of encoding and transcoding comprises transcoding.

7. The method of claim 1, wherein some of said data streams are uncompressed and some of said data streams are compressed, and wherein said carrying out said one of encoding and transcoding into said compressed versions, in accordance with said output bit rates, comprises transcoding said compressed data streams and encoding said uncompressed data streams.

8. The method of claim 1, wherein, in said step of determining said plurality of output bit rates, said plurality of output bit rates are determined to minimize said overall cost.

9. The method of claim 1, wherein said plurality of output bit rates are determined directly.

10. The method of claim 1, wherein said plurality of output bit rates are determined indirectly, by specifying a quantization step size for said one of encoding and transcoding.

11. The method of claim 1, further comprising providing a system, wherein the system comprises distinct software modules, each of the distinct software modules being embodied on a computer-readable storage medium, and wherein the distinct software modules comprise a statistics estimator module and a joint encoding controller module;
    wherein:
    said determining of said statistical parameters associated with each of said data streams is carried out by said statistics estimator module executing on at least one hardware processor; and
    said obtaining said plurality of storage constraints and said determining of said plurality of output bit rates are carried out by said joint encoding controller module executing on said at least one hardware processor.

12. An apparatus comprising:
    means for obtaining a plurality of data streams;
    means for determining statistical parameters associated with each of said data streams;

means for obtaining a plurality of storage constraints;

means for determining a plurality of output bit rates for one of encoding and transcoding each of said data streams, based on said statistical parameters and said storage constraints, to jointly reduce an overall cost, said overall cost comprising a cost associated with storing compressed versions of said data streams, wherein determining an output bit rate for a data stream is based on the statistical parameters associated with each of said data streams; and means for, for each of said data streams, carrying out said one of encoding and transcoding into said compressed versions, in accordance with said output bit rates, wherein said encoding and transcoding is not performed for a data stream if an incurred encoding/transcoding cost is greater than a storage cost savings achieved by the encoding/transcoding, wherein storage cost is calculated based on a minimum storage time, a maximum distortion, and a file size, and wherein the storage cost is calculated as:

$$C(S_j, V_j) = cL_j | O_j | j = 1, 2 \ldots N,$$

wherein $L_j$ is the minimum storage time, $O_j$ is the file size, $S_j$ is the plurality of data streams, $v_j$ is the plurality of storage constraints, c is a unit storage cost, j is a natural number greater than 0 and N is a number of data stream sources.

13. A computer program product comprising a non-transitory computer readable storage medium having computer readable program code embodied therewith, said computer readable program code comprising:

computer readable program code configured to obtain a plurality of data streams;

computer readable program code configured to determine statistical parameters associated with each of said data streams;

computer readable program code configured to obtain a plurality of storage constraints;

computer readable program code configured to determine a plurality of output bit rates for one of encoding and transcoding each of said data streams, based on said statistical parameters and said storage constraints, to jointly reduce an overall cost, said overall cost comprising a cost associated with storing compressed versions of said data streams, wherein determining an output bit rate for a data stream is based on the statistical parameters associated with each of said data streams; and computer readable program code configured to, for each of said data streams, facilitate carrying out said one of encoding and transcoding into said compressed versions, in accordance with said output bit rates, wherein said encoding and transcoding is not performed for a data stream if an incurred encoding/transcoding cost is greater than a storage cost savings achieved by the encoding/transcoding, wherein storage cost is calculated based on a minimum storage time, a maximum distortion, and a file size, and wherein the storage cost is calculated as:

$$C(S_j, V_j) = cL_j | O_j | j = 1, 2 \ldots N,$$

wherein $L_j$ is the minimum storage time, $O_j$ is the file size, $S_j$ is the plurality of data streams, $V_j$ is the plurality of storage constraints, c is a unit storage cost, j is a natural number greater than 0 and N is a number of data stream sources.

14. The computer program product of claim 13, wherein said statistical parameters comprise complexity parameters.

15. The computer program product of claim 13, wherein said storage constraints comprise at least quality, length of archive time, and available storage capacity.

16. The computer program product of claim 13, wherein said data streams are uncompressed, and wherein said one of encoding and transcoding comprises encoding.

17. The computer program product of claim 13, wherein said data streams are compressed, and wherein said one of encoding and transcoding comprises transcoding.

18. The computer program product of claim 13, wherein some of said data streams are uncompressed and some of said data streams are compressed, and wherein said computer readable program code configured to facilitate carrying out said one of encoding and transcoding into said compressed versions, in accordance with said output bit rates, comprises computer readable program code configured to facilitate transcoding said compressed data streams and computer readable program code configured to facilitate encoding said uncompressed data streams.

19. The computer program product of claim 13, wherein said computer readable program code configured to determine said plurality of output bit rates comprises computer readable program code configured to determine said plurality of output bit rates so as to minimize said overall cost.

20. The computer program product of claim 13, wherein said computer readable program code configured to determine said plurality of output bit rates comprises computer readable program code configured to determine said plurality of output bit rates directly.

21. The computer program product of claim 13, wherein said computer readable program code configured to determine said plurality of output bit rates comprises computer readable program code configured to determine said plurality of output bit rates indirectly, by specifying a quantization step size for said one of encoding and transcoding.

22. An apparatus comprising:

a memory and at least one processor, coupled to said memory;

a statistics estimator;

a joint encoding controller coupled to said statistics estimator; and a plurality of encoder-transcoders coupled to said joint encoding controller;

wherein:

said statistics estimator is configured to determine statistical parameters associated with each of a plurality of data streams;

said joint encoding controller is configured to:

obtain a plurality of storage constraints; and determine a plurality of output bit rates for one of encoding and transcoding each of said data streams, based on said statistical parameters and said storage constraints, to jointly reduce an overall cost, said overall cost comprising a cost associated with storing compressed versions of said data streams, wherein determining an output bit rate for a data stream is based on the statistical parameters associated with each of said data streams; and said plurality of encoder-transcoders are configured to, for each of said data streams, carry out said one of encoding and transcoding into said compressed versions, in accordance with said output bit rates, wherein said encoding and transcoding is not performed for a data stream if an incurred encoding/transcoding cost is greater than a storage cost savings achieved by the encoding/transcoding, wherein storage cost is calculated based on a minimum storage time, a maximum distortion, and a file size, and wherein the storage cost is calculated as:

$C(S_j, V_j) = cL_j|O_j| j=1,2\ldots N,$ wherein $L_j$ is the minimum storage time, $O_j$ is the file size, $S_j$ is the plurality of data streams $V_j$ is the plurality of storage constraints, c is a unit storage cost, is a natural number greater than 0 and N is a number of data stream sources.

23. The apparatus of claim 22, wherein:
said statistics estimator comprises a distinct statistics estimator software module implemented on said at least one processor;
said joint encoding controller comprises a distinct joint encoding controller software module implemented on said at least one processor; and
said plurality of encoder-transcoders are implemented in hardware.

24. The apparatus of claim 22, wherein:
said statistics estimator comprises a distinct statistics estimator software module implemented on said at least one processor;
said joint encoding controller comprises a distinct joint encoding controller software module implemented on said at least one processor; and
said plurality of encoder-transcoders comprise a plurality of encoder-transcoder modules implemented on said at least one processor.

25. The apparatus of claim 22, wherein some of said data streams are uncompressed and some of said data streams are compressed, and wherein said plurality of encoder-transcoders are configured to carry out said one of encoding and transcoding into said compressed versions, in accordance with said output bit rates, by transcoding said compressed data streams and encoding said uncompressed data streams.

* * * * *